June 6, 1944. G. PELESSONI 2,350,809
WING FOR AIRCRAFT WITH VARIABLE SURFACE
Filed Sept. 27, 1940
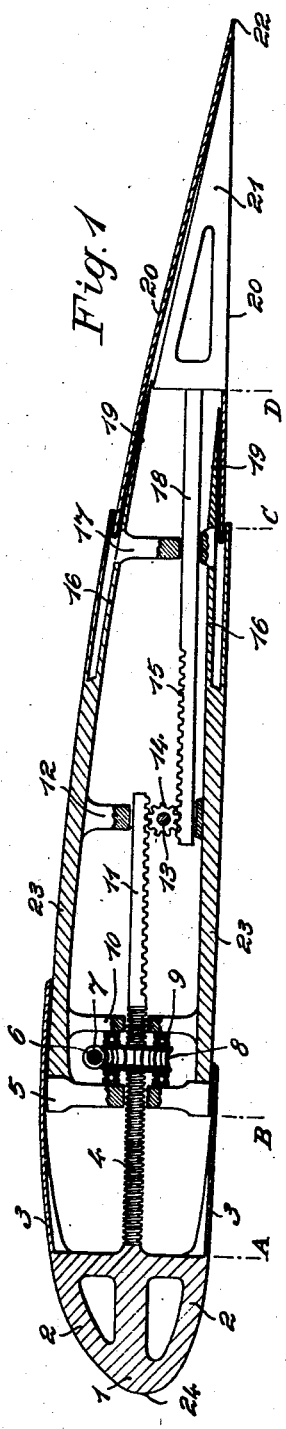
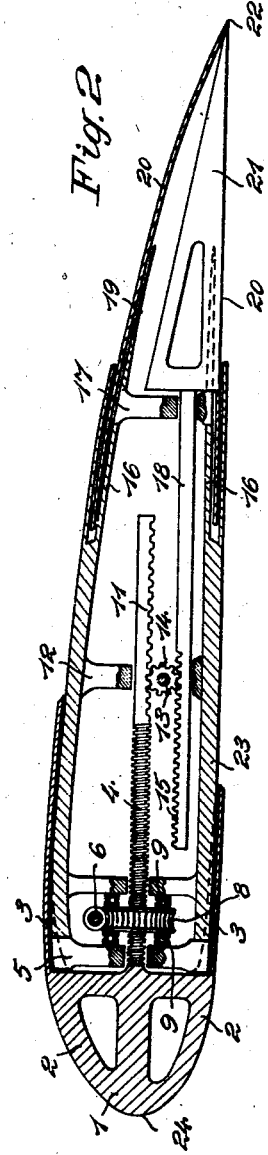
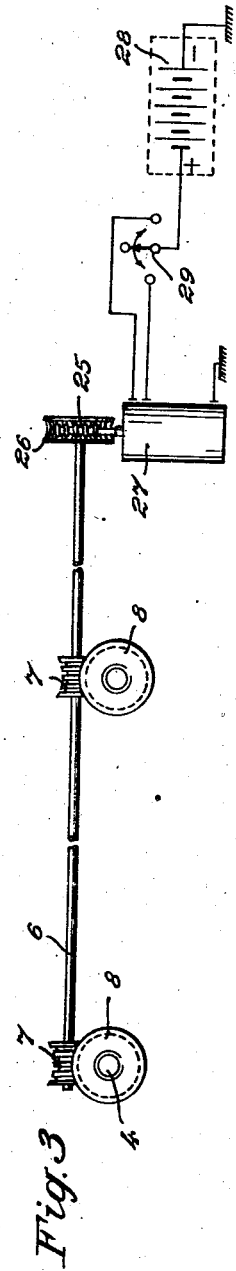
Inventor
G. Pelessoni
By C. F. Wenderoth
atty.

Patented June 6, 1944

2,350,809

UNITED STATES PATENT OFFICE 2,350,809

WING FOR AIRCRAFT WITH A VARIABLE SURFACE

Giovanni Pelessoni, Udine, Italy; vested in the Alien Property Custodian

Application September 27, 1940, Serial No. 358,731
In Italy September 16, 1939

5 Claims. (Cl. 244—43)

The present invention relates to a wing for aircrafts, characterised in that the wing surface may be varied at will both on earth and during the flight.

The possibility of varying the carrying or lifting surface of a wing before and during the flight offers remarkable advantages to aerial navigation as for instance in the following cases.

(A) During the flights at great distance, characterized by the quantity of fuel at disposal on the aircraft at the moment of start, said fuel being absorbed by the power during the flight thus diminishing the weight of the same fuel on the aircraft so that after a certain time the wing surface is in exuberance, the possibility in this case to reduce the lifting surface during the flight allows a remarkable and progressive increase of speed to the aircraft and at the same time to reach the destinations prefixed in a remarkably shorter time.

(B) In the aircrafts with the charge of a high lift wing section obliged to a long running for starting, the possibility to increase the wing surface diminishes the lifting coefficient thus the starting of the aircrafts being remarkably facilitated.

(C) In the aircrafts flying at a top speed obliged to land at a high speed, the possibility to increase the wing surface during the flight removes all the systems of oversustentation studied for deforming the profile in order to modify the air flux all around and to brake the aircraft at landing.

In the accompanying drawing the Figures 1 and 2 show schematically the complex of the wing in the position of maximum and minimum surface which may be obtained.

Fig. 1 shows the profile of the wing with the maximum surface obtained running from the leading edge 24 to the trailing edge 22, said surface being obtained by the displacement of the half wings 1 and 21 occurred from B to A for the fore one and from C to D for the back one 21.

Fig. 2 shows the profile of the wing with the two half wings 2 and 21 completely retired, the wing having the minimum lifting surface.

The wing is subdivided into two parts: the one fixed, the other moveable.

The fixed part going from B to C comprises the longerrons 5 and 17, the fixed ribs 23 and the half ribs 19. In said part there are to be found all the functioning members for the variation of the wing surface.

The moveable part comprises the half wings 1 and 21.

The fore half wing 1 with the leading edge 24 comprises the fixed ribs 2, the half ribs 3 and the screw-axle 4 with rack 11, with said axle all the parts mentioned forming a single body.

The back half wing with the trailing edge 22 comprises the rib 21, the sliding covering 20 and the axle 18 with rack 15, all the parts mentioned forming with this axle a unique body.

Fig. 3 shows the motion transmitting axle 6 running longitudinally through the wing with worm gears 7, screw wheels 8, screw axles 4; while the screw groups 26 and 25 and the electric motor 27 are placed within the fuselage with the electric battery 28 and the control for the wing surface variaton comprising the three-way switch 29.

The device is actioned by the electric motor 27 placed in the fuselage and fed by the electric battery 28.

The control device comprises the three-way switch 29: the neutral position N, the left position S, the right side position D.

According to position S the electric motor rotates in the left handed direction and according to position D in the right handed one.

The electric energy of the battery 28 is transmitted over the switch 29 to the electric motor 27, this motor making the worm wheel 25 rotate which is engaged with the screw wheel 26 fixed on the transmitting shaft 6. On this shaft 6 there are fixed the worm wheels 7 each being in engagement with a screw wheel provided with a screw hole 8.

In such a way the number of revolutions of the electric motor 27 is transmitted strongly diminished to the screw wheels 8, which, since they are obliged to rotate on their own axles, the thrust bearings 9 preventing them from executing a motion of translation, oblige the screw axles 4 in engagement with them to be displaced forwards and backwards longitudinally according to the sense of rotation communicated to the electric motor 27 by the switch 29. Owing to the interposition of the tooth wheel 14 rotating on the pin 12, between the racks 11 and 15 fixed on the axles 4 and 18, obliges the axle 18 to be displaced in the opposite sense of the axle 4.

In this way the speedy rotary motion of the electric motor 27 has been transformed into the slow rectilineal motion of the half wings 1 and 21 by means of the axles 4 and 18 with which said half wings form a unique body.

The device also comprises an automatic stop allowing to stop the stroke of the half wings when they have reached the maximum or the minimum of their stroke.

The irreversibility of the half wing motion is secured by the screw and the helicoidal groups.

All wing surface variations are obtained at will as well on earth as in any other circumstance of flight without displacing the position of the centre of gravity of the aircraft with respect to the wing and its centre of pressure.

The motion of the half wings may be obtained with any other possible device and different from the one described and illustrated only by way of example.

Having now particularly described and ascertained the nature of my said invention and in what manner the same is to be performed, I declare that what I claim is:

1. In an aircraft wing structure in which a movable leading portion and a movable trailing portion are provided upon a fixed central wing body whereby the wing surface may be varied by extending and retracting the two movable portions, a mechanism for extending the two movable portions mounted on the central wing body and comprising, a shaft extending longitudinally of the wing and carrying a worm gear, a cooperating gear meshing with said worm gear and adapted to be rotated thereby, said cooperating gear having a threaded central opening, means pivotally supporting said cooperating gear, a threaded shaft extending through the threaded opening in said cooperating gear and having a threaded engagement therewith, a rack fixed to said threaded shaft in alignment therewith, an idler gear rotatably mounted on a pivot fixed to the central wing body and meshing with said rack, a second rack meshing with said idler gear and having a longitudinal extension, and means connecting said threaded shaft and its rack with one of the movable portions and said second rack and its longitudinal extension with the other of said movable portions.

2. A structure as described in claim 1 wherein the means mounting said cooperating gear is in the form of a pair of ball-bearing units mounted about said threaded shaft and upon opposite sides of said cooperating gear and having stationary races attached to the central wing body.

3. A structure as described in claim 1 wherein said threaded shaft is attached directly to the movable leading portion so that the moving forces are transmitted directly from said cooperating gear to the leading portion.

4. A structure as described in claim 1 wherein said shaft and the worm gear are positioned at the leading edge of said central wing body and said threaded shaft is connected with the movable leading portion, and wherein said idler gear cooperates with said cooperating gear in assisting in supporting said threaded shaft and its cooperating rack, and wherein the rotation of the shaft and the worm gear is initiated by a reversible electric motor.

5. A wing for an aircraft comprising, a fixed central wing body having a rigid frame, a movable leading portion mounted upon said central wing body and having top and bottom walls which overlap above and below the respective upper and lower walls of said central wing body, longitudinal means extending rigidly from said movable leading portion intermediate its top and bottom walls and extending rearwardly thereof into said central wing body, means mounting said longitudinal means for longitudinal movement and holding said longitudinal means rigidly with respect to said rigid frame whereby said movable leading portion is adjustably supported in predetermined relationship with respect to said central wing body, means to move said longitudinal means thereby to transmit movement to said movable leading portion, a movable trailing portion mounted upon and telescoped within the trailing edge of said central wing body with its upper and lower walls positioned beneath and above, respectively, the upper and lower walls of the central wing body, and longitudinal means rigid with respect to said movable trailing portion and extending forwardly into said central wing body and having a geared mechanical connection with the longitudinal means of the movable leading portion whereby the movement of the two movable portions is coordinate.

GIOVANNI PELESSONI.